(12) United States Patent
Kjerstad

(10) Patent No.: US 8,495,912 B2
(45) Date of Patent: Jul. 30, 2013

(54) DEVICE FOR A VERTICAL ELECTROMAGNETIC FIELD COMPONENT RECEIVER

(75) Inventor: Jostein Kåre Kjerstad, Stavanger (NO)

(73) Assignee: Advanced Hydrocarbon Mapping AS, Stavanger (NO)

( * ) Notice: Subject to any disclaimer, the term of this patent is extended or adjusted under 35 U.S.C. 154(b) by 233 days.

(21) Appl. No.: 13/123,556

(22) PCT Filed: Oct. 9, 2009

(86) PCT No.: PCT/NO2009/000352
§ 371 (c)(1),
(2), (4) Date: Jul. 5, 2011

(87) PCT Pub. No.: WO2010/041959
PCT Pub. Date: Apr. 15, 2010

(65) Prior Publication Data
US 2011/0296908 A1    Dec. 8, 2011

(30) Foreign Application Priority Data
Oct. 10, 2008    (NO) .................................. 20084252

(51) Int. Cl.
*G01L 3/00* (2006.01)
(52) U.S. Cl.
USPC .................................... 73/170.29; 73/170.33
(58) Field of Classification Search
None
See application file for complete search history.

(56) References Cited

U.S. PATENT DOCUMENTS

| | | | |
|---|---|---|---|
| 3,514,693 A | 5/1970 | Cagniard | |
| 4,112,714 A * | 9/1978 | Rosenthal et al. | 68/206 |
| 4,241,604 A * | 12/1980 | Hergenrother | 73/170.06 |
| 4,856,330 A * | 8/1989 | Honda et al. | 73/204.25 |
| 6,976,393 B1 * | 12/2005 | Kimball et al. | 73/170.29 |
| 7,116,108 B2 | 10/2006 | Constable | |
| 2006/0038570 A1 | 2/2006 | Constable | |

FOREIGN PATENT DOCUMENTS

| | | |
|---|---|---|
| GB | 2450158 A | 12/2008 |
| JP | 2008005215 | 1/2008 |
| WO | WO03/104844 A1 | 12/2003 |

* cited by examiner

*Primary Examiner* — Lisa Caputo
*Assistant Examiner* — Jermaine Jenkins
(74) *Attorney, Agent, or Firm* — GableGotwals

(57) ABSTRACT

A device for disposing an antenna dipole arranged to be submerged in a water mass is described. A first electrode is placed, in an operative position, approximately vertically above and at a distance from a second electrode. A mast is pivotally secured, at a portion distant from, in the operative position, a lower end portion, to a stand. The first electrode is arranged near, in or on an upper end portion of the mast. The second electrode is arranged near, in or on the lower end portion of the mast. The mast and/or stand includes means which are arranged to keep the mast in a prescribed position. The mast and stand are formed substantially of non-magnetic materials.

20 Claims, 5 Drawing Sheets

DEVICE FOR A VERTICAL ELECTROMAGNETIC FIELD COMPONENT RECEIVER

CROSS-REFERENCE TO RELATED APPLICATIONS

This application is the United States National Phase of PCT Patent Application No. NO 2009/000352 filed on 9 Oct. 2009, which was published in English on 15 Apr. 2010 under Publication No. WO 2010/041959 A1, which claims priority to Norwegian Patent Application No. 20084252 filed 10 Oct. 2008, both of which are incorporated herein by reference.

The invention relates to a device for a receiver antenna for a vertical electromagnetic field component in a water mass, more particularly a non-metallic mast provided with at least one pair of spaced-apart electrodes, the attachment of the mast in a supporting stand being arranged to keep one electrode of a pair of electrodes approximately vertically above the second electrode of the pair of electrodes, and to provide a satisfactory vertical distance between the electrodes when the receiver antenna is in an operative position.

When measuring the vertical electromagnetic field component during the mapping of subsea bedrock structures to demonstrate possible oil and/or gas reservoirs, for example, it is necessary to deploy vertical receiver dipoles in the water masses above the structure which is being surveyed.

The strength of the signals registered by the receiver antenna is directly related to the length of the receiver antenna, that is to say the distance between the two electrodes of a pair of electrodes forming the dipole of the receiver antenna. The larger the distance is, the better signal quality is achieved. Important to the signal quality is also that the two electrodes of the dipole are disposed correctly with one electrode vertically above the other.

If the dipole is positioned submergedly and floatingly in the water masses, the currents in the water masses will require that the individual electrode be provided with positioning means. This complicates the construction of the dipole.

The dipole must be affected by noise to the smallest possible extent, that is to say that the electromagnetic signals must be affected to the smallest possible extent by non-controllable factors, for example metals in adjacent elements.

If the dipole is placed in a stand resting on a seabed, the requirement for a sufficiently large antenna length will result in the antenna stand being relatively bulky when it is to maintain a desired distance between electrodes when the antenna is placed in an operative position. This may complicate or render impossible the handling of the stand during deployment on or retrieval from the seabed.

The verticality of a receiver antenna supported by a stand will depend on the slope of the seabed. If exactly vertical positioning of the antenna is to be achieved, the stand must be adjustable relative to the ground surface, or the antenna must be adjustable relative to the stand. Currents in the water masses may affect these settings, so that repeated adjustments will be necessary to maintain a correct, vertical setting of the dipole.

The invention has for its object to remedy or reduce at least one of the drawbacks of the prior art.

The object is achieved through features which are specified in the description below and in the claims that follow.

The invention relates to a device for setting up a vertical dipole, arranged to receive a vertical electromagnetic field component for example, in which a mast carrying at least one of the two electrodes of the dipole is arranged to take an approximately vertical position independently of the conditions of the floor on which the supporting stand of the mast is placed and little affected by currents in the water masses in which the dipole is submerged. This is achieved by the mast being attached, by means of a pivot joint, to a portion of the stand projecting upwards, the mast being pivotal around two axes. The mast and/or the stand are/is provided with means arranged to provide and maintain a prescribed horizontal positioning of the electrodes of the dipole.

This can be achieved in several ways. In one aspect, the effective centre of gravity of the mast is placed at a sufficiently large distance from the pivot joint, so that in a freely pivoting manner, the mast will seek to take a vertical position. When, in this aspect, one of the two electrodes of the dipole is attached to the upper end portion of the mast and the other electrode is attached to the lower end portion of the mast, possibly attached, horizontally movable, to the foundation of the stand, the dipole may be disposed vertically and kept there, possibly by the mast being locked in the desired position. To make the flow forces that affect the mast not cause any movement of the mast worth mentioning, flow resistance elements could be placed at appropriate places on the mast to even out the flow resistance at different vertical levels in the water mass.

In another aspect, the upper electrode is fixed on the stand, whereas the lower electrode is arranged in a lower end portion of a mast which is pivotally suspended, by an upper end portion, from the stand. When the mast is pivoting freely, it may, as it is described above, take a vertical position, ensuring that the dipole takes a correct position. Alternatively, the lower portion of the mast may be fixed in a horizontally movable mast mounting, for example a biaxial, horizontally movable actuator which is arranged to position the lower electrode in a desired position.

To facilitate the handling of the device according to the invention, some of the elements projecting upwards, for example the mast, if it projects above the pivot joint, or the stand and mast, if the pivot joint is arranged at the upper end portion of the mast, may be telescopic. During movement on land and at sea, this will reduce the building height of the device and thereby be less demanding regarding the lifting height (also called hook height) of lifting equipment et cetera. When the device is placed on the seabed, the device is extended into its operative position, so that the normal electrode distance is achieved. This may typically be in the order of 10-20 meters.

The stand rests on a surface which is usually a portion of a seabed. It is an advantage to give the stand a tripod design, so that it stands stably. Placing a large mass in close proximity to the points of support provides for the stability of the stand to increase further. To increase the stability further, a portion of the stand projecting upwards is connected via a stay or the like to an anchoring point which lies outside the periphery of the stand.

To avoid signal interference, the device is formed substantially of non-magnetic materials. For reasons of signal interference and maintenance, it is also an advantage if the materials are non-metallic.

The invention relates more specifically to a device for disposing an antenna dipole, in which at least one pair of electrodes is arranged to be submerged in a body of water, a first electrode being arranged, in an operative position, approximately vertically above and at a distance from a second electrode, characterized by a mast being pivotally attached, in a portion distant from an, in the operative position, lower portion of the mast, to a stand;

the first electrode being arranged near, in or on an upper end portion of the mast;

the second electrode being arranged near, in or on the lower end portion of the mast;

the mast and/or stand including means which are arranged to keep the mast in a prescribed position; and the mast and stand being formed substantially of non-magnetic materials.

The stand may be provided with a pivot joint arranged for connection to a portion of the mast.

The stand may be provided with at least three legs which are supported at a lower portion by a foundation, and an upper node forms a connection between portions of the legs distantly from the foundation.

The pivot joint may be arranged near the upper node.

The pivot joint may, alternatively, be arranged on an arm projecting freely upwards from the foundation of the stand.

A mid portion of the mast may be attached to the pivot joint.

The upper end portion of the mast may be attached to the pivot joint.

The stand may be provided with a foundation including a biaxial actuator system arranged to fix the lower end portion of the mast horizontally.

In the lower end portion, the mast may be provided with one or more ballast elements.

Each of the legs of the stand may be telescopic.

Each of the telescopic legs of the stand may be provided with means for remote-controlled adjustment of the length of the leg.

A slide-out leg element in each of the legs may be provided with at least one buoyancy body.

The at least one buoyancy body may be constituted by an internal cavity of the slide-out leg element.

The internal cavity of the slide-out leg element may be in closable fluid communication with a gas accumulator.

One or more of the legs may be provided with an actuator which is arranged to adjust the length of the respective leg individually.

The foundation may be provided with ballast means arranged for stabilization of the stand against a surface.

The foundation may be arranged to accommodate a signal receiver unit.

The mast may be telescopic.

Each of the electrodes may be provided with means for verifying the position of the electrode in a horizontal plane, possibly also in a vertical plane.

The mast and/or stand may be provided with measuring instruments taken from the group consisting of geophysical and oceanographic measuring instruments.

In what follows is described an example of a preferred embodiment which is visualized in the accompanying drawings, in which.

Figure 1:
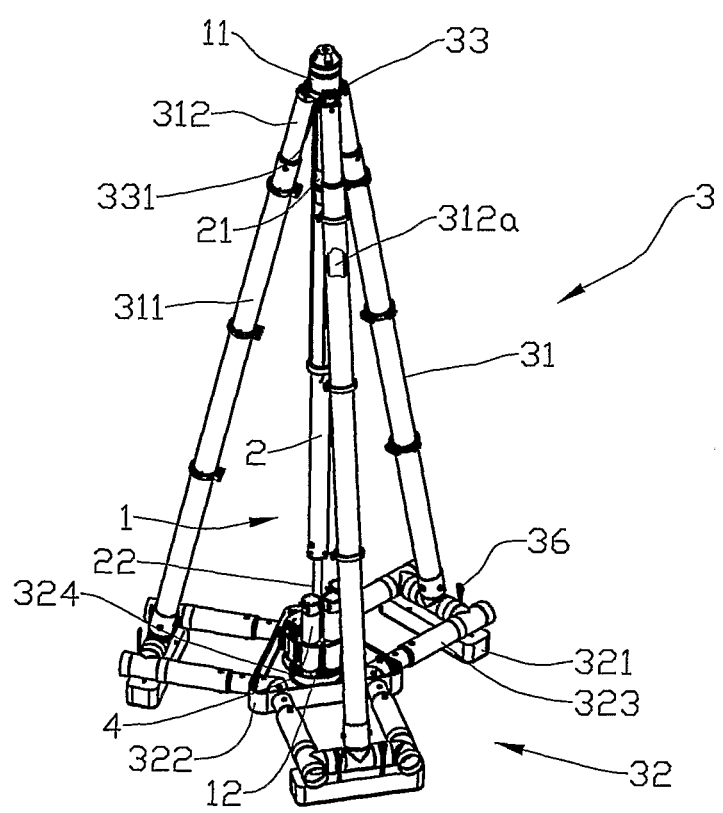
FIG. 1 shows, in perspective, a first exemplary embodiment of the device according to the invention in a retracted state.
Figure 2:
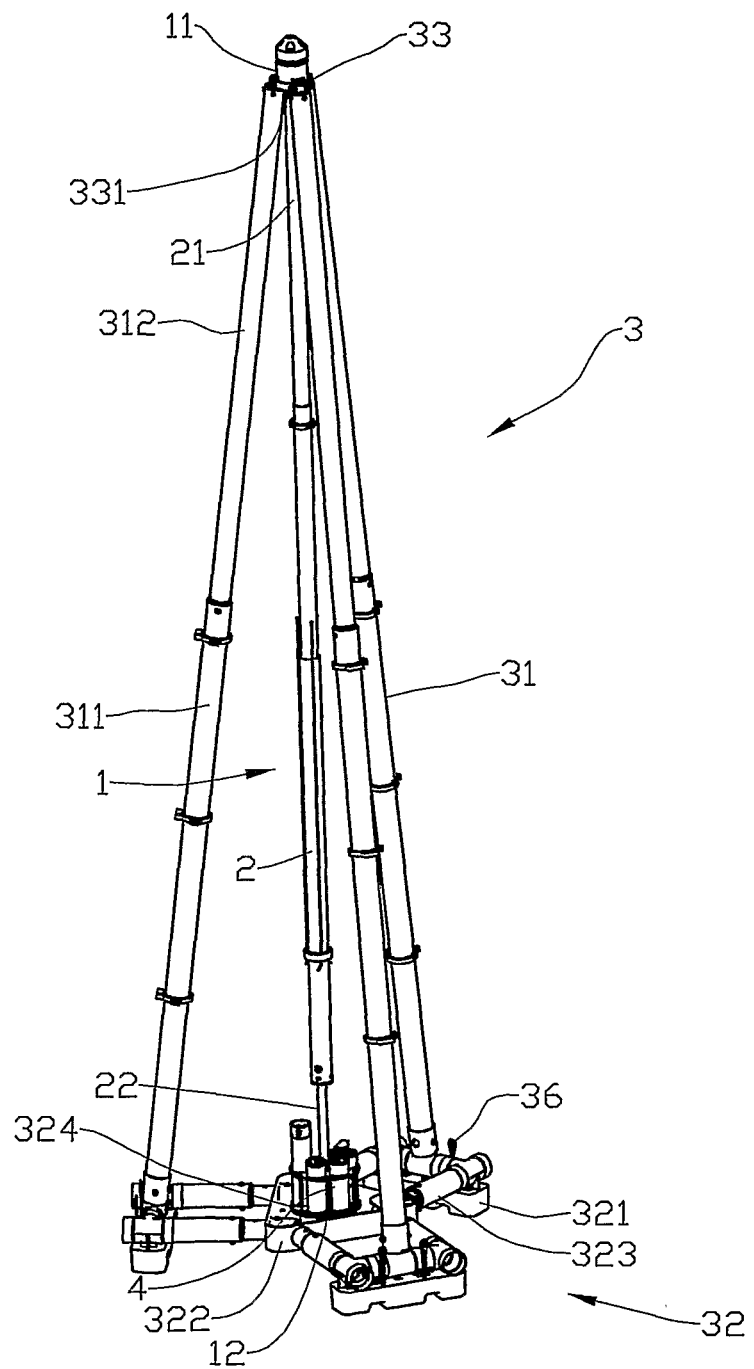
FIG. 2 shows the device in a fully erected, operative position.
Figure 3:
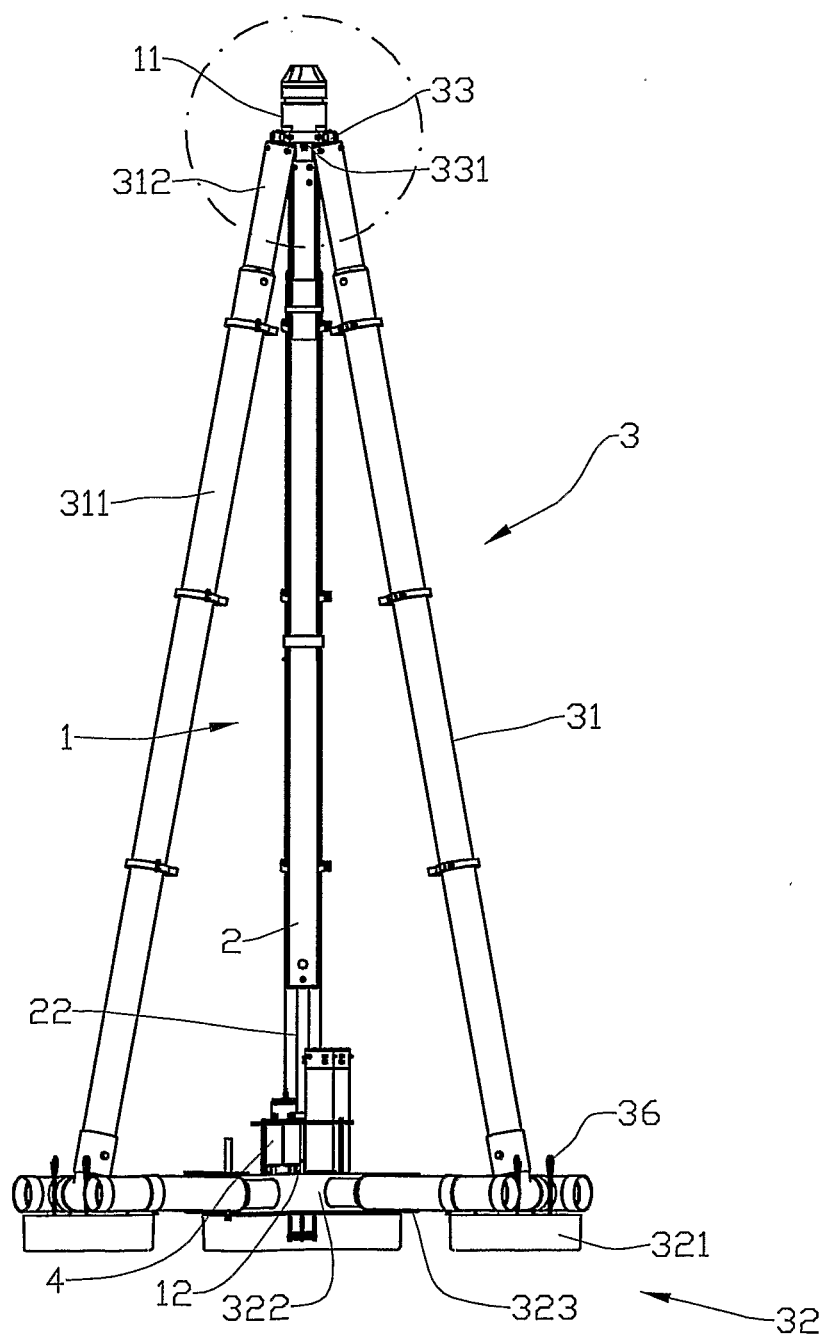
FIG. 3 shows, on a somewhat larger scale, a side view of the first exemplary embodiment in a retracted position.
Figure 4:
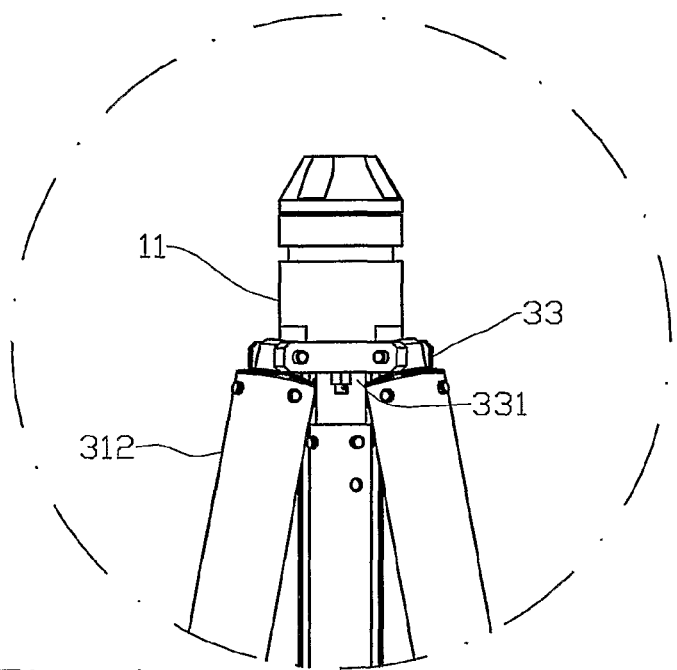
FIG. 4 shows a detail A of FIG. 3 on a larger scale.
Figure 5:
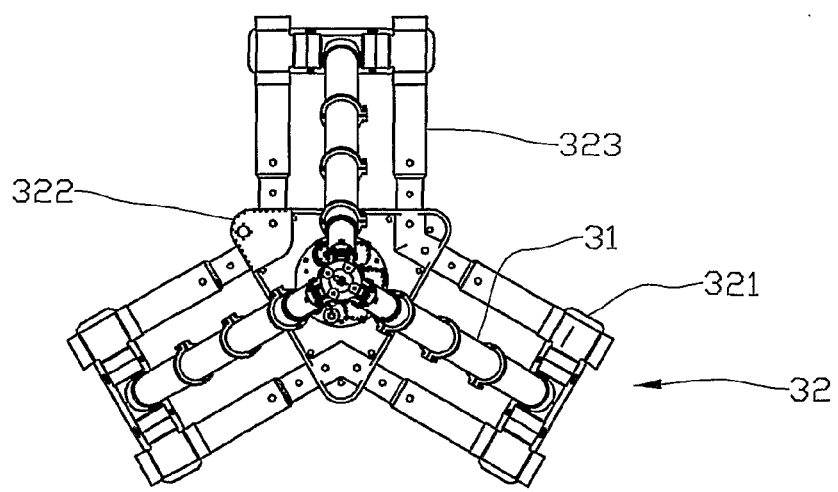
FIG. 5 shows a ground plan of the first exemplary embodiment on the same scale as FIG. 3.

Reference is first made to the FIGS. 1-5 in which a first exemplary embodiment of the device according to the invention includes an antenna dipole 1, an antenna mast 2, a stand 3 and a signal receiver unit 4.

The dipole 1 includes a first electrode 11 arranged above and at a distance from a second electrode 12 and connected to each other in an electrically conductive manner known per se. The first electrode 11 is arranged in close proximity to an upper end portion 21 of the mast 2 which includes wires connecting the first electrode 11 to the second electrode 12 arranged adjacent to a lower end portion 22 of the mast 2.

The mast 2 is suspended from a stand 3 including three legs 31 which are secured at the periphery of a foundation 32, converging towards an upper node 33 at which the legs 31 are connected to each other.

At the upper node 33 is formed a pivot joint 331 to which the mast 2 is attached.

The foundation 32 is provided with a foot 321 for each leg 31. The foot 321 is appropriately formed with a bearing surface adapted for the surface on which the stand is to rest and with a sufficient mass to ensure that the foundation 32 will not be lifted by the buoyancy forces of the water mass in which the stand 3 is to be placed. A sufficiently large mass may be provided by the material from which the foot 321 is formed, or suitable ballast (not shown) may be provided internally or externally on the foot 321.

The foundation 32 is further provided with a base 322 arranged to carry a load (see below), possibly to form or fix a mast mounting 324. The mast mounting 324 is arranged to be fixed in an arbitrary position on the base 322 in order thereby to set the mast 2 vertically.

The base 322 is connected to the feet 321 by means of a number of stays 323.

The legs 31 are telescopic, as a leg element 311 which is fixed to the foundation 32 accommodates a slide-out leg element 312 forming the connection of the leg 31 to the upper node 33. The slide-out leg element 312 has an internal cavity 312a which works as a buoyancy body.

The mast 2 is telescopic.

The stand 3 is provided with several hoist attachment elements 36 arranged at the foundation 32.

The lower end portion 22 may appropriately include a ballast element (not shown), possibly integrated in a container (not shown) surrounding the second electrode 12.

The base 322 is arranged to accommodate various means, such as a signal receiver 4 in signal communication with the dipole antenna 1, communication means (not shown) for transferring information between the device and a control unit (not shown) at the surface, means of adjusting and monitoring the lengths of the legs 31 et cetera.

When a vertical dipole antenna 1 is to be deployed on the sea bed, a device according to the invention with a desired specification (type of electrode, operative electrode spacing et cetera) is provided; it is transported to the desired position where it is lowered onto the seabed. The mast 2 is adjusted in such a way that the antenna dipole 1 takes a vertical position. The lower end portion 22 of the mast 2 is locked to the base 322 by means of the mast mounting 324.

The telescopic legs 31 provide an advantage during movement of the device according to the invention at the surface (on land or at sea) as the mast 2 and stand 3 may then be in a retracted position, see FIG. 1. This increases stability during movement and reduces the so-called hook height of lifting devices (cranes). When the stand 3, complete with elements 1, 2, 4, has been positioned on the seabed, the legs 31 are moved out into their desired lengths. This is carried out by the buoyancy forces, which act on said leg element 312 because of the internal cavities 312a, making the legs 31 telescope. When each leg has reached its desired length, the telescoping may possibly be locked by means (not shown) for locking the telescoping.

To prevent the legs 31 from being moved out into their full lengths because of the buoyancy forces while the device is being lowered in the water masses, it is an advantage that at least some lifting lines (not shown) which are connected to the lifting device (not shown) have been passed from the lifting hook (not shown) via their respective hoist attachment elements 36 to an attachment on or at the upper node 33. By this design, the legs 31 will telescope only after the device has been set down and the lifting lines have been relieved. During lifting from the seabed the effect will be a corresponding one, namely that the legs 31 are pushed together against the buoyancy forces by the lifting lines being tightened by the lifting device as the lifting operation starts.

In an alternative embodiment (not shown), the slide-out leg elements 312 may be pushed or pulled out mechanically.

As the stand 3 telescopes, the mast 2 will telescope as well, so that the distance between the electrodes 11, 12 of the dipole antenna 1 increases to the desired size.

Individual adjustment of the lengths of the legs 31 and/or positioning of the mast mounting 324 on the stand 322 ensures that the antenna dipole 1 takes a desired, vertical position.

Said ballast element (not shown) in the lower end portion 22 of the mast 2 may stabilize the mast 2 and ensure that it telescopes into its full length as the stand 3 is pulled out into its operative position.

Before retrieval of the device according to the invention, the telescoping process described above is reversed.

Figure 6:
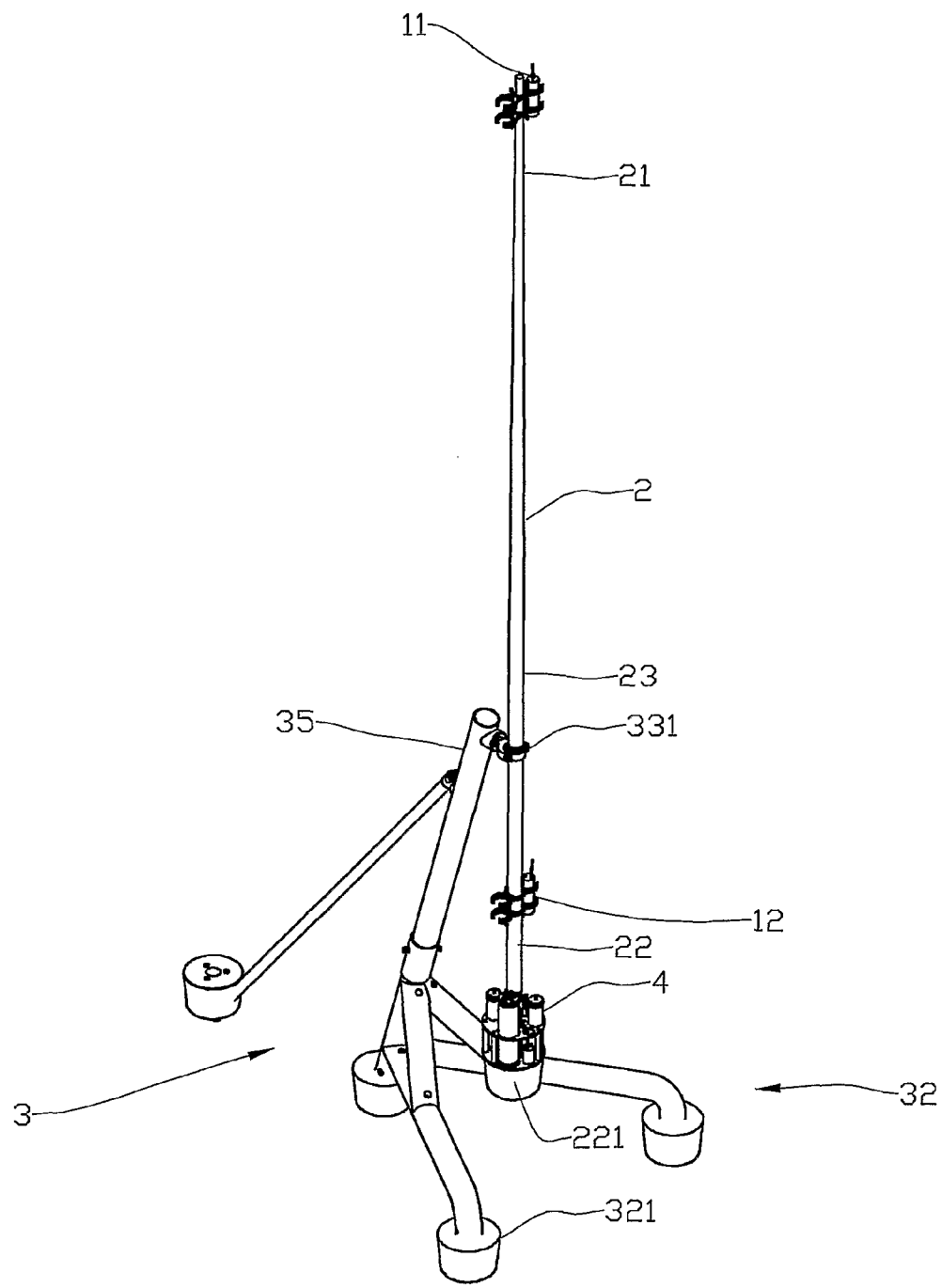
FIG. 6 shows, in perspective, a second exemplary embodiment of the device according to the invention in an operative position.

In another embodiment, as it appears from FIG. 6, the mast 2 is suspendedly arranged on an arm 35 projecting upwards and outwards from the stand 3, which, in this embodiment, has a fixed leg length. The pivot joint 331 is connected to a mid portion 23 of the mast 2. A ballast element 221 is provided at the lower end portion 22 of the mast 2 in close proximity to the second electrode 12.

In this embodiment the mast 2 hangs freely. Because of the weight of the lower end portion 22, the mast will seek to take a vertical position.

It is obvious to arrange the mast 2 telescopically in this embodiment as well, as the telescoping takes place above the connecting point of the pivot joint 331. By providing the movable mast element(s) with one or more buoyancy bodies, for example internal, gas-filled cavities 312 as described for the legs 31 of the first exemplary embodiment, the buoyancy forces acting on the mast 2 when the device is lowered into the water masses will result in the mast being extended to provide a desired electrode distance.

The invention claimed is:

1. A device for disposing an antenna dipole (1) arranged to be submerged in a water mass, a first electrode (11) being placed, in an operative position, approximately vertically above and at a distance from a second electrode (12), said device comprising:
    a mast (2) is pivotally secured to a stand (3), in a portion distant from, in the operative position, a lower end portion (22) of the mast (2);
    the first electrode (11) is arranged near, in or on an upper end portion (21) of the mast (2);
    the second electrode (12) is arranged near, in or on the lower end portion (22) of the mast (2);
    at least one of the mast (2) and stand (3) includes positioning means which are arranged for keeping the mast (2) in a prescribed position; and
    the mast (2) and stand (3) are formed substantially of non-magnetic materials.

2. The device in accordance with claim 1, wherein the stand (3) is provided with a pivot joint (331) arranged for connection to a portion of the mast (2).

3. The device in accordance with claim 1, wherein the stand (3) is provided with at least three legs (31) which are supported at a lower portion (311) by a foundation (32), and an upper node (33) forms a connection between portions of the legs (31) distant from the foundation (32).

4. The device in accordance with claim 3, characterized in that the pivot joint (331) is arranged near the upper node (33).

5. The device in accordance with claim 2, wherein the pivot joint (331) is arranged on an arm (35) projecting freely up from the foundation (32).

6. The device in accordance with claim 5, wherein a mid portion (23) of the mast (2) is secured to the pivot joint (331).

7. The device in accordance with claim 4, wherein the upper end portion (21) of the mast (2) is secured to the pivot joint (331).

8. The device in accordance with claim 1, wherein the stand (3) is provided with a foundation (32) which includes a biaxial actuator system arranged to fix the lower end portion (22) of the mast (2) horizontally.

9. The device in accordance with claim 1, wherein the lower end portion (22) the mast (2) is provided with one or more ballast elements (221).

10. The device in accordance with claim 3, wherein each of the legs (31) of the stand (3) is telescopic.

11. The device in accordance with claim 10, wherein each of the telescopic legs (31) of the stand (3) is provided with one or more adjustment means for remote-controlled adjustment of the length of the leg (3).

12. The device in accordance with claim 10 wherein a slide-out leg element (312) in each of the legs (31) is provided with at least one buoyancy body (312a).

13. The device in accordance with claim 12, wherein the at least one buoyancy body (312a) is constituted by an internal cavity in the slide-out leg element (312).

14. The device in accordance with claim 13, wherein the internal cavity in the slide-out leg element (312) is in closable fluid communication with a gas accumulator.

15. The device in accordance with claim 10, wherein one or more of the legs (31) is provided with an actuator which is arranged to adjust the length of the respective leg (31) individually.

16. The device in accordance with claim 1, wherein the foundation (32) is provided with ballast means (321) arranged for stabilization of the stand (3) on a surface.

17. The device in accordance with claim 1, wherein the foundation (32) is arranged to accommodate a signal receiver unit (4).

18. The device in accordance with claim 1, wherein the mast (2) is telescopic.

19. The device in accordance with claim 1, wherein each of the first and second electrode (11, 12) is provided with verification means for verifying the position of the electrode (11, 12) in at least one of a horizontal plane and vertical plane.

20. The device in accordance with claim 1, wherein the device is provided with measuring instruments taken from the group consisting of geophysical and oceanographic measuring instruments.

* * * * *